United States Patent
Nielsen et al.

(10) Patent No.: US 11,346,689 B2
(45) Date of Patent: May 31, 2022

(54) OPTICAL MEASURING SYSTEM WITH AN INTERROGATOR AND A POLYMER-BASED SINGLE-MODE FIBRE-OPTIC SENSOR SYSTEM

(71) Applicant: Danmarks Tekniske Universitet, Kgs. Lyngby (DK)

(72) Inventors: Kristian Nielsen, Virum (DK); Ole Bang, Virum (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 15/780,393

(22) PCT Filed: Dec. 2, 2016

(86) PCT No.: PCT/EP2016/079541
§ 371 (c)(1),
(2) Date: May 31, 2018

(87) PCT Pub. No.: WO2017/093458
PCT Pub. Date: Jun. 8, 2017

(65) Prior Publication Data
US 2018/0356263 A1 Dec. 13, 2018

(30) Foreign Application Priority Data
Dec. 2, 2015 (EP) .................................. 15197578

(51) Int. Cl.
*G01D 5/34* (2006.01)
*G01D 5/353* (2006.01)

(52) U.S. Cl.
CPC ....... *G01D 5/35383* (2013.01); *G01D 5/3537* (2013.01); *G01D 5/35374* (2013.01)

(58) Field of Classification Search
CPC combination set(s) only.
See application file for complete search history.

(56) References Cited

U.S. PATENT DOCUMENTS 7,746,545 B2 * 6/2010 Okuno ................ H01S 3/06795
359/326
8,417,306 B2 * 4/2013 Cheng .................... A61B 5/021
600/324

(Continued)

FOREIGN PATENT DOCUMENTS

CN 102507074 A 6/2012
EP 0146522 A2 6/1985

(Continued)

OTHER PUBLICATIONS

International Search Report PCT/ISA/210 for International Application No. PCT/EP2016/079541 dated Feb. 9, 2017.

(Continued)

*Primary Examiner* — Tony Ko
(74) *Attorney, Agent, or Firm* — Harness, Dickey & Pierce, P.L.C.

(57) ABSTRACT

The present invention relates to an optical measuring system comprising a polymer-based single-mode fibre-optic sensor system (102), an optical interrogator (101), and an optical arrangement (103) interconnecting the optical interrogator (101) and the polymer-based single-mode fibre-optic sensor system (102). The invention further relates to an optical interrogator adapted to be connected to a polymer-based single-mode fibre-optic sensor system via an optical arrangement. The interrogator comprises a broadband light source arrangement (104) and a spectrum analysing arrangement which receives and analyses light reflected from the polymer-based single-mode fibre-optic sensor system.

12 Claims, 5 Drawing Sheets

(56) References Cited

U.S. PATENT DOCUMENTS

| | | | |
|---|---|---|---|
| 10,088,589 B2 * | 10/2018 | Tenghamn | G01V 1/201 |
| 10,473,492 B2 * | 11/2019 | Kim | G01J 1/04 |
| 2006/0045412 A1 | 3/2006 | Xiao et al. | |
| 2012/0050849 A1 * | 3/2012 | Schreiber | G02B 21/16 |
| | | | 359/371 |
| 2014/0203783 A1 | 7/2014 | Kiesel et al. | |
| 2014/0233020 A1 | 8/2014 | Goldner et al. | |
| 2016/0018319 A1 * | 1/2016 | Hegyi | G02B 6/12009 |
| | | | 356/73.1 |
| 2018/0003571 A1 * | 1/2018 | Monro | G01K 11/3206 |

FOREIGN PATENT DOCUMENTS

| | | | |
|---|---|---|---|
| WO | WO-2007/137429 A1 | 12/2007 | |
| WO | WO-2013/052932 A1 | 4/2013 | |
| WO | WO-2013/169098 A1 | 11/2013 | |

OTHER PUBLICATIONS

Written Opinion of the International Searching Authority PCT/ISA/237 for International Application No. PCT/EP2016/079541 dated Feb. 9, 2017.

Alessio Stefani et al., "High Sensitivity Polymer Optical Fiber-Bragg-Grating-Based Accelerometer", IEEE Photonics Technology Letters, vol. 24, No. 9, May 1, 2012, pp. 763-765.

* cited by examiner

OPTICAL MEASURING SYSTEM WITH AN INTERROGATOR AND A POLYMER-BASED SINGLE-MODE FIBRE-OPTIC SENSOR SYSTEM

CROSS-REFERENCE TO RELATED APPLICATIONS

This application is a national phase under 35 U.S.C. § 371 of PCT International Application No. PCT/EP2016/079541 which has an International filing date of Dec. 2, 2016, which claims priority to European Application No. 15197578.6, filed Dec. 2, 2015, the entire contents of each of which are hereby incorporated by reference.

FIELD OF THE INVENTION

The present invention relates to an optical measuring system and an optical interrogator comprised in the system. In particular, the invention relates to an optical measuring system with a large bandwidth covering more than 2000 nm.

BACKGROUND OF THE INVENTION

Various optical sensor interrogation systems for measuring different physical parameters have been suggested over the years.

For example, WO 2013/169098 discloses an optical sensor interrogation system comprising a light source, optical arrangements for connecting the source and sensor(s), a detector for receiving optical response from the sensor(s) and a data processing system. More precisely, the system comprises two optical arrangements, one to guide the light from the source and another one to guide the light reflected from the sensor. These arrangements are described mainly to comprise free-space optics connecting a fibre-based source and a fibre sensor what is a disadvantage of the system since it cannot be installed with sensors at one location and the interrogator at another.

US 2014/0233020 relates to an interrogator for a plurality of sensor fibre-optic gratings. The interrogator comprises a broadband optical source, at least one beam-splitter directing output of the source to an array of sensors, and at least one optical receiver.

None of the aforementioned references disclose sensors as polymer-based single-mode fibre sensors comprising fibre-Bragg gratings.

It is an object of embodiments of the present invention to provide an optical measuring system which combines a polymer-based single-mode fibre-optic sensor system with an interrogator.

It is a further object of embodiments of the present invention to provide an optical measuring system suitable for being mounted in for example off-shore constructions and remote locations.

DESCRIPTION OF THE INVENTION

The above-mentioned objects are complied with by providing, in a first aspect, to an optical measuring system comprising
1) a polymer-based single-mode fibre-optic sensor system, comprising at least one fibre-Bragg grating;
2) an optical interrogator comprising a broadband light source arrangement for emitting light at a plurality of wavelengths within a wavelength range, and a spectrum analysing arrangement for receiving and analysing light reflected from the polymer-based single-mode fibre-optic sensor system; and
3) an optical arrangement interconnecting the optical interrogator and the polymer-based single-mode fibre-optic sensor system.

The polymer-based single-mode fibre-optic sensor system may comprise a plurality of polymer single-mode optical fibres. The polymer single-mode optical fibres may be micro-structured fibre. Multi-mode polymer fibres may optionally constitute part of the sensor system as well.

In the present context, "polymer-based" fibre should be understood as a fibre having a polymer core with or without dopants. Such dopants may increase the sensitivity in relation to specific materials surrounding the optical sensor or may target the sensitivity of the sensor. Possible dopants may include any chemical compounds and even particles. The polymer base material of the core may be polymethylmethacrylate (PMMA). The cladding as well as the cap of the optical fibre structure may comprise polymer materials as well as materials like metal, semiconductors, ceramics etc.

In a preferred embodiment, the polymer-based single-mode fibre-optic sensor system comprises a plurality of single-mode polymer optical fibres where each of the polymer optical fibres comprises one or more fibre-Bragg gratings (FBGs) being arranged therein. The FBG may be placed only at a sensing point of the sensor. Each FBG is adapted to measure at least one physical parameter. The parameter may be any physical parameter, such as strain, temperature, pressure, humidity, and/or any other parameter. The FBG is a structure imprinted in a short segment of polymer-based single-mode optical fibre, at a sensing point, as mentioned above, so that the index of refraction varies in a periodic manner along the grating causing a particular wavelength of light to be reflected while all the others are transmitted. The physical parameter to be measured causes changes in the refractive index or the periodicity of the grating and therefore a shift in the reflected wavelength. By determining this wavelength shift, the physical parameter can be determined. Typically, the FBGs may reflect light in the range from 400 to 2500 nm, such as in the wavelength range from 400 to 2000 nm, such as in the wavelength range from 400 to 1500 nm, such as in the wavelength range from 400 to 1200 nm, such as in the wavelength range from 400 to 1000 nm, such as in the wavelength range from 500 to 900 nm, or such as within the wavelength range from 600 to 650 nm. However, other wavelength ranges are applicable as well.

In one embodiment, the polymer-based single-mode fibre-optic sensor system may comprise three FBGs being adapted to measure strain, temperature and humidity at essentially the same time. These FBGs may be imprinted into a single polymer fibre being spatially displaced along the fibre. In another embodiment, the plurality of FBGs of at least one single-mode polymer optical fibre may be imprinted into essentially the same spot. The FBGs arranged in this manner form a compact structure. In this case, the periods of the gratings are slightly different in order to reflect different wavelengths, thereby enabling measurement of different physical parameters.

The optical measuring system further includes an optical interrogator for interrogation of the polymer-based single-mode fibre-optic sensor system. The interrogator comprises a broadband light source arrangement and a spectrum analysing arrangement.

The broadband light source arrangement is configured to emit light at a plurality of wavelengths within a broad wavelength range. It may in principle involve any type of a single broadband light source, such as superluminescent diodes, semiconductor optical amplifiers (SOAs), amplified spontaneous emission (ASE) source, super continuum fibre lasers or white light lasers, such as SuperK light sources. In another embodiment, it may also involve an array of single-wavelength lasers covering broad bandwidth. In a preferred embodiment of the invention, the broadband light source arrangement is adapted to emit light in the wavelength range from 400 to 2500 nm, such as in the wavelength range from 400 to 2000 nm, such as in the wavelength range from 400 to 1500 nm, such as in the wavelength range from 400 to 1200 nm, such as in the wavelength range from 400 to 1000 nm, such as in the wavelength range from 500 to 900 nm, or such as in the wavelength range from 600 to 650 nm. However, other wavelength ranges are applicable as well. The bandwidth of the broadband light source defines the bandwidth of the optical interrogator.

The spectrum analysing arrangement is configured to receive and analyse light reflected from the polymer-based single-mode fibre-optic sensor system. According to the invention, the spectrum analysing arrangement may comprise a single fibre-based broadband photodetector, charge-coupled device (CCD) spectrometer, or one or more discrete photodetectors for detecting different wavelength ranges. The bandwidth of the spectrum analysing arrangement may be at least matched, if not larger than the bandwidth of the broadband light source arrangement. Naturally, the spectrum analysing arrangement may further comprise a digital signal processor for processing the detected light beam.

The optical measuring system may further include an optical arrangement interconnecting the optical interrogator and the polymer-based single-mode fibre-optic sensor system. In one embodiment, the optical arrangement may form a silica-based fibre-optic distribution network. The silica-based fibre-optic distribution network may comprise one or more silica-based single-mode optical fibres, one or more silica-based optical splitters and couplers and/or one or more silica-based fibre multiplexers. All the components comprised in the distribution network must support the entire bandwidth of the optical interrogator. Optical splitters make the optical measuring system suitable for installation in large areas, in which the optical interrogator may be located in one room while all the sensors are distributed elsewhere.

According to one embodiment of the invention, an optical measuring system in its most basic implementation has a distribution network comprised of only a single fibre-optic circulator. In another embodiment, where the optical measuring system comprises N optical sensors, the optical distribution network may be represented by a fibre-optic circulator and 1-to-N splitter/coupler. In an embodiment in which N=2, the optical distribution network may be represented by a fibre-optic circulator and a silica-based fibre coupler. The connection between the silica-based optical network and polymer-based single-mode optical fibre sensors may be established by appropriate mechanical connectors. The optical distribution network may support bi-directional light path, i.e. both the light sent from the broadband light source and the light reflected from the sensor system may be guided by the same components.

In another embodiment, the optical measuring system may comprise an optical distribution network formed by free-space optics. Such a network may comprise lenses, beam-splitters, prisms, mirrors, diffractive elements, etc. which guide/collimate/direct the light beam to/from the interrogator to the polymer-based single-mode fibre-optic sensor system through free-space.

The optical measuring system can be deployed in different environments, such as houses, tall buildings, large ships or even off-shore constructions. Depending on the application, a single-parameter sensor may be placed in the environment in which only one physical parameter needs to be measured, while a multi-parameter sensor will be placed in the environment requiring knowledge about a plurality of physical parameters such as strain, temperature, pressure, humidity, or/and other requiring parameters. When installed in remote locations, the optical measuring system may need to be remotely monitored and controlled. Therefore, the invention may further comprise a wireless communication system adapted to provide data to and/or from the optical measuring system.

According to a further embodiment, the optical measuring system may comprise a power supply system which can be a standard supply obtaining the energy from an electrical source, or alternatively it can be powered by a renewable power source, including solar panels, wind power systems etc. The latter examples would be of particular importance when the optical measuring system is installed on a ship or an off-shore construction.

In a second aspect, the present invention relates to an optical interrogator adapted to be connected to a polymer-based single-mode fibre-optic sensor system via an optical arrangement. The optical interrogator according to the second aspect comprises:
1) a broadband light source arrangement for emitting light at a plurality of wavelengths within a wavelength range; and
2) a spectrum analysing arrangement for receiving and analysing light reflected from the polymer-based single-mode fibre-optic sensor system.

The broadband light source arrangement of the optical interrogator is adapted to emit light at a plurality of wavelengths in the wavelength range from 400 to 2500 nm, such as in the wavelength range from 400 to 2000 nm, such as in the wavelength range from 400 to 1500 nm, such as in the wavelength range from 400 to 1200 nm, such as in the wavelength range from 400 to 1000 nm, such as in the wavelength range from 500 to 900 nm, or such as in the wavelength range from 600 to 650 nm.

The spectrum analysing arrangement of the optical interrogator may comprise charge-coupled device (CCD) spectrometer or a plurality of discrete detectors.

BRIEF DESCRIPTION OF THE DRAWINGS

The invention will now be described in further details with reference to the accompanying drawings, in which.

While the invention is susceptible to various modifications and alternative forms, specific embodiments have been shown by way of example in the drawings and will be described in detail herein. It should be understood, however, that the following description relates to examples of embodiments, and the invention is not intended to be limited to the particular forms disclosed. Rather, the invention covers all modifications, equivalents, and alternatives falling within the spirit and scope of the invention as defined by the appended claims.

DETAILED DESCRIPTION OF THE INVENTION

In its most general aspect, the present invention relates to an optical measuring system and an optical interrogator for measuring a plurality of physical parameters at essentially the same time. The optical measuring system comprises an optical interrogator and a polymer-based single-mode fibre-optic sensor system being interconnected via an optical arrangement, such as an optical distribution network. The optical measuring system according to the present invention may advantageously be used in a wide variety of applications due to its large bandwidth.

The present invention further relates to an optical interrogator comprising a broadband light source arrangement and a corresponding detection system, i.e. spectrum analysing arrangement, in which the interrogator is adapted to be connected to a polymer-based single-mode fibre-optic sensor system via an optical arrangement.

Figure 1:
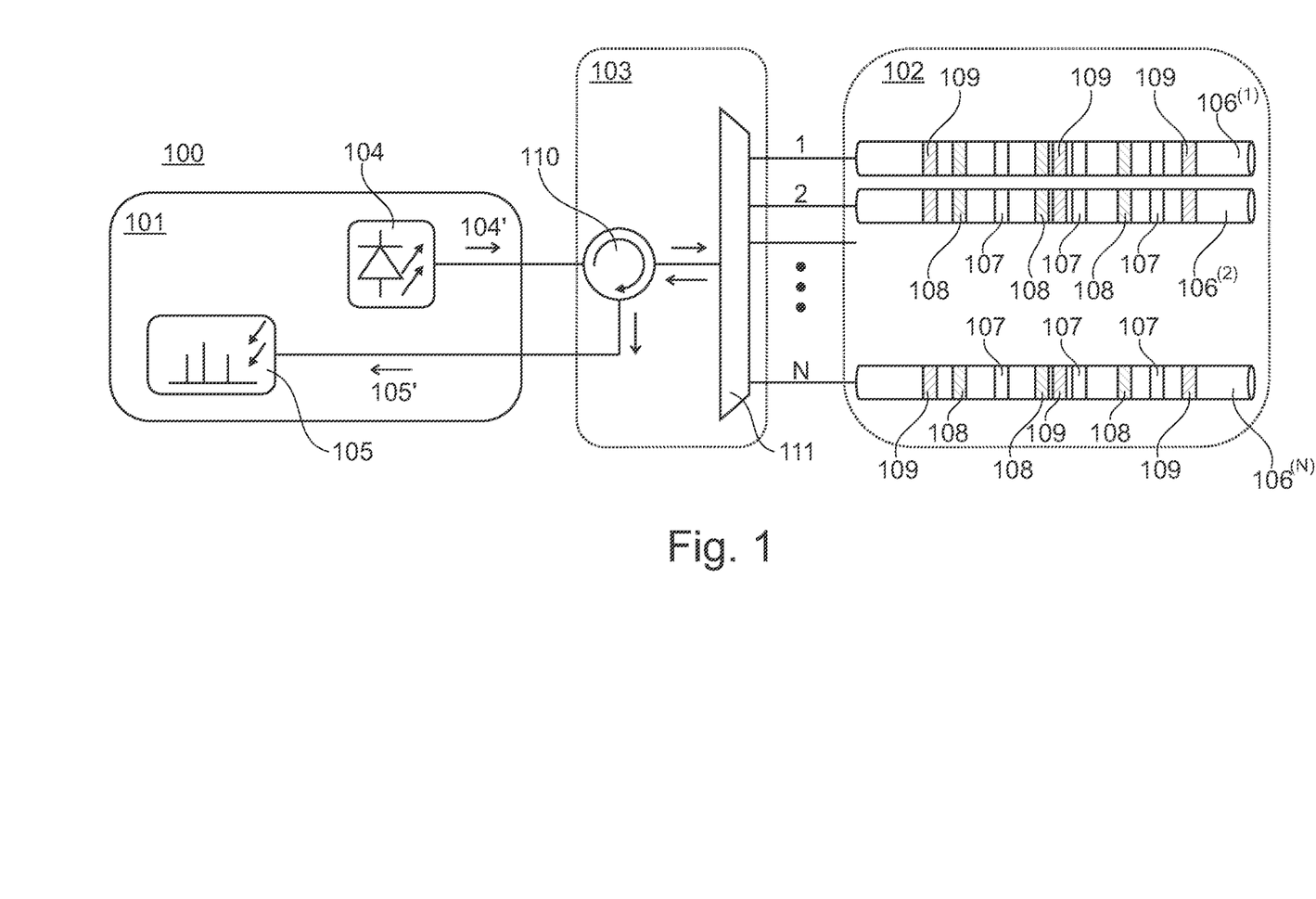
FIG. 1 illustrates an optical measuring system with N sensors, where each sensor is adapted to measure three physical parameters.

In FIG. 1, the optical measuring system 100 of the present invention is shown. The system comprises an optical interrogator 101 and a fibre-optic sensor system 102 connected via an optical arrangement 103.

The optical interrogator 101, which is a single unit, comprises a broadband light source arrangement 104 and a spectrum analysing arrangement 105. It further comprises an output 104' connected to the source. Typically, the output 104' is a silica-based optical fibre which outputs the light from the interrogator. An optical input to the interrogator 105' can also be implemented by the use of a silica-based optical fibre connecting the optical arrangement and the spectrum analysing arrangement 105. In some embodiments, the interrogator may comprise a plurality of input and output ports 105' and 104' for a direct connection to the polymer-based single-mode fibre-optic sensor system. A number of additional components such as different electronic circuits, signal processing units, and various connections therein are not shown the figure. Furthermore, the interrogator comprises a power supply (also not shown in the figure) which can be a standard supply obtaining the energy from an electrical source, or it can be powered by a solar panel. The latter example would be of particular importance when the optical measuring system is installed on a ship or an off-shore construction. Additionally, the interrogator may comprise a number of optical components, such as filters, beam-splitters, gratings, amplifiers, etc. which interconnect the source and spectrum analysing arrangement and create a feed-back loop to provide a stable system without any wavelength errors.

The broadband light source arrangement 104 may comprise a single broadband source, such as a white light laser, supercontinuum laser, superluminescent diode, semiconductor optical amplifiers, an amplified spontaneous emission source, or an array of single-wavelength lasers covering broad bandwidth. In a preferred embodiment of the invention, the broadband light source arrangement is adapted to emit light in the wavelength range from 400 to 2500 nm, such as in the wavelength range from 400 to 2000 nm, such as in the wavelength range from 400 to 1500 nm, such as in the wavelength range from 400 to 1200 nm, such as in the wavelength range from 400 to 1000 nm, such as in the wavelength range from 500 to 900 nm, or such as in the wavelength range from 600 to 650 nm. The bandwidth of the broadband light source defines the bandwidth of the optical interrogator 101.

The spectrum analysing arrangement 105 for receiving and analysing light reflected from the fibre-optic sensor system may comprise a single fibre-based broadband photodetector, a charge-coupled device spectrometer or one or more photodetectors for detecting different wavelength ranges. The bandwidth of the spectrum analysing arrangement 105 is preferably at least matched, if not larger than the bandwidth of the broadband light source arrangement 104. Naturally, the spectrum analysing arrangement 105 may further comprise processor means for processing the detected light beam.

In a preferred embodiment of the invention, the fibre-optic sensor system 102 comprises N polymer-based single-mode optical fibres $106^{(1)}$, $106^{(2)}$, and $106^{(N)}$, where N can be any positive integer. Typically, the polymer-based single-mode optical fibre can be a micro-structured fibre. Multi-mode polymer-based fibres may also serve as sensors and may be included in the system. The polymer-based single-mode fibre-optic sensor $106^{(1)}$, $106^{(2)}$, and $106^{(N)}$ may comprise a plurality of FBGs. As an example, a sensor with three spatially overlapping FBGs, 107, 108, and 109 is illustrated in FIG. 1. The FBGs arranged in this manner form a compact structure. In another implementation, FBGs may also be spatially displaced. Each FBG is adapted to measure at least one physical parameter. The parameter may be any physical parameter, such as strain, temperature, pressure, humidity, or/and other parameter. Typically, the FBGs 107, 108, and 109 may reflect light in the range from 400 to 2500 nm, such as in the wavelength range from 400 to 2000 nm, such as in the wavelength range from 400 to 1500 nm, such as in the wavelength range from 400 to 1200 nm, such as in the wavelength range from 400 to 1000 nm or such as in the wavelength range from 500 to 900 nm, or such as in the wavelength range from 600 to 650 nm. However, other wavelength ranges are applicable as well. In the case where the sensor comprises a number of spatially overlapped FBG, the periods of the gratings are slightly different in order to reflect different wavelengths enabling measurement of different physical parameters.

The optical arrangement 103 may form a silica-based fibre-optic distribution network which comprises one or more silica-based single-mode optical fibres, one or more silica-based optical splitters and couplers, one or more silica-based fibre multiplexers or free-space optical lens systems. All the components comprised in the optical distribution network must support the entire bandwidth of the optical interrogator 101. Optical splitters provide a point to multipoint topology, making the optical distribution network suitable for installation in large areas, such as tall buildings, large ships or off-shore constructions where the optical interrogator is located in one room while all the sensors are distributed elsewhere. In such arrangements the optical fibres connecting the optical arrangement 103 and fibre-optic sensor system 102 may be very long.

The splitters also provide an easy upgrade with minimal change of the existing network. In the embodiment illustrated in FIG. 1, the optical distribution network is represented by a single fibre-optic circulator 110 and 1-to-N splitter/coupler 111, since it may be sufficient to ensure the connection with N optical sensors. In an embodiment in which N=2, coupler 111 will be implemented by a simple 1-to-2 coupler. The connection between the silica-based optical network and polymer-based single-mode optical fibre sensors may be established by appropriate mechanical connectors. Arrows in the optical arrangement 103 show the directions of the light waves traveling through the optical measuring system. It should be noted that the optical distribution network supports bi-directional light path, i.e. both the light sent from the broadband light source and the light reflected from the sensor system may be guided by the same components. Although the fibre-optic circulator 110 is likely to provide the best signals a conventional 2×2 coupler will be sufficient in many cases.

Figure 2:
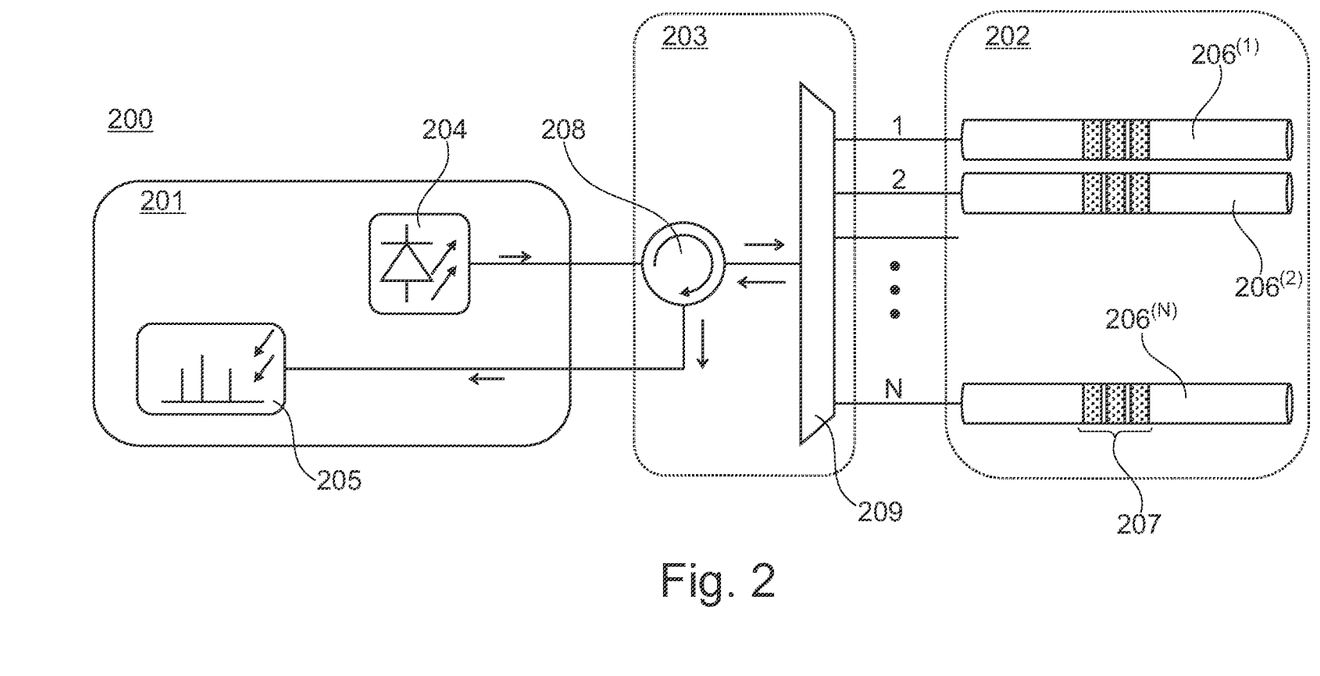
FIG. 2 illustrates an optical measuring system with N sensors, where each sensor is adapted to measure one physical parameter.

FIG. 2 illustrates another embodiment of an optical measuring system 200 which comprises the same optical interrogator 201 as that of embodiment of FIG. 1 and a fibre-optic sensor system 202 connected to the interrogator 201 via the optical distribution network 203. In this embodiment, the sensor system comprises N polymer-based single-mode fibre-optic sensors, $206^{(1)}$, $206^{(2)}$, and $206^{(N)}$. These sensors comprise only one FBG 207 so that each sensor may be used for measuring only one physical parameter. Sensors $206^{(1)}$, $206^{(2)}$, and $206^{(N)}$ can, however, measure different physical parameters. In another embodiment, the optical measuring system may comprise a combination of single-parameter sensors (sensors comprising one FBG) and multi-parameter sensors (sensors comprising plurality of FBGs). Depending on the application, a single-parameter sensor may be placed in the environment in which only one physical parameter needs to be measured, while a multi-parameter sensor will be placed in the environment requiring knowledge about a plurality of physical parameters such as strain, temperature, pressure, humidity, or/and other requiring parameters.

Figure 3:
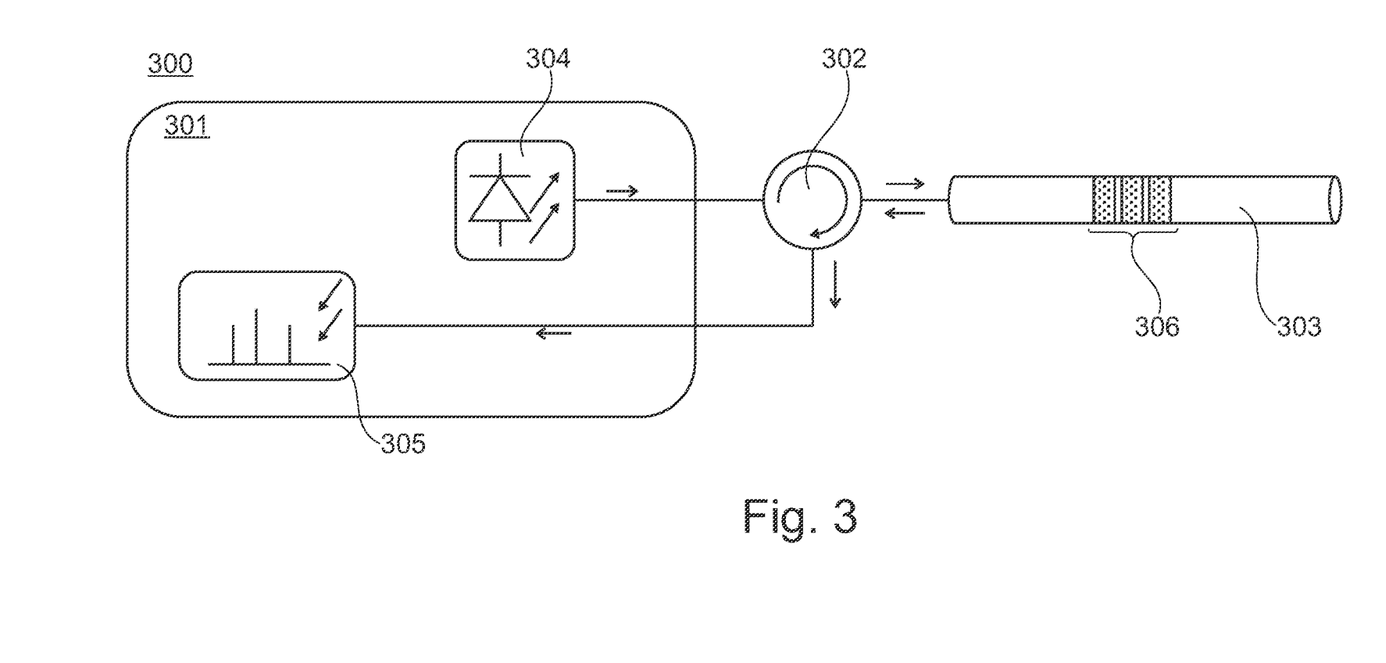
FIG. 3 illustrates an optical measuring system adapted to measure one physical parameter.

Yet another embodiment of the invention is illustrated in FIG. 3 which shows an optical measuring system 300 in its most basic implementation, comprising only the essential parts of the present invention. The system comprises an optical interrogator 301 and a polymer-based single-mode fibre-optic sensor 303 connected via an optical distribution network, which, in this embodiment, is represented by a single fibre-optic circulator 302. The sensor 303 is shown with only one FBG 306 for measuring one physical parameter, however, it may be replaced by a sensor having a plurality of spatially displaced FBGs, or even a plurality of spatially overlapping gratings, so that the optical measuring system comprising only one sensor may provide information of more than one physical parameter at essentially the same time.

Figure 4:
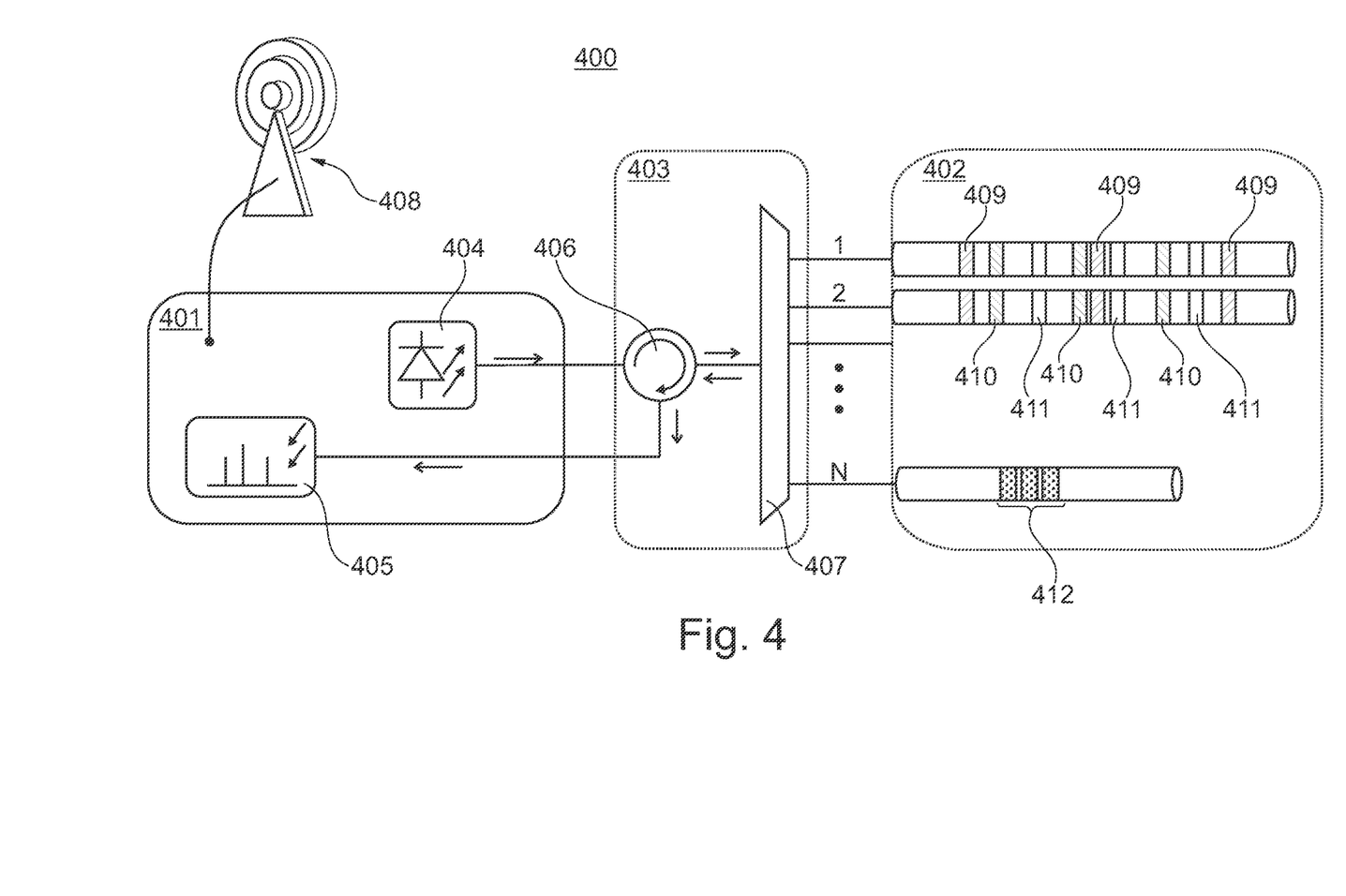
FIG. 4 illustrates an optical measuring system comprising a wireless communication system.

Additionally, the optical measuring system 400 illustrated in FIG. 4 may further comprise a wireless communication system 408 adapted to provide data to and/or from the optical measuring system. This can be implemented in different monitoring systems installed in large areas, such as tall buildings, large ships or even off-shore constructions, so that these can be monitored and possibly controlled remotely.

Figure 5:
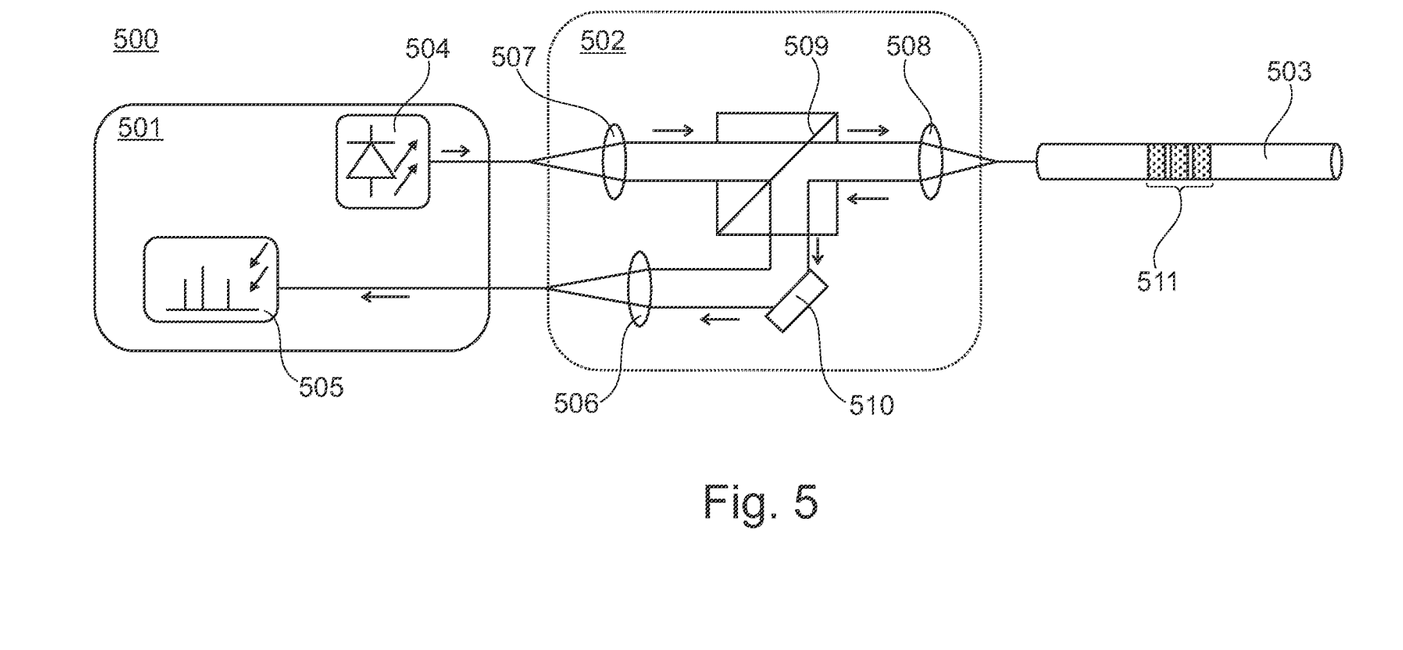
FIG. 5 illustrates an optical measuring system with free space optics as a distribution network.

Alternatively, the optical measuring system may comprise an optical arrangement built from free-space optic components. Such a system is illustrated in FIG. 5. The optical measuring system 500 is depicted comprising an optical interrogator 501 with the broadband light source arrangement 504 and the spectrum analysing arrangement 505. In the illustrated embodiment, the system 500 comprises only one polymer-based single-mode fibre-optic sensor 503 having only one FBG. The optical arrangement 502 comprises a plurality of optical lenses 506, 507, 508 and an optical prism 509 guiding the light beam through free space. Optical lenses 506, 507, 508 collimate a light beam propagating through free space, ensuring good coupling with fibre-based sensor 503 as well as with the input to the interrogator, i.e. the spectrum analysing arrangement 505. The optical prism 509 directs the light beam, ensuring that the light reflected from the sensor 503, i.e. its FBG, does not travel towards the broadband source 504. In another embodiment, sensor 503 with only one FBG 511 may be replaced by a sensor comprising multiple spatially overlapping, spatially displaced gratings, or alternatively, it may be replaced by a plurality of sensors. In that case, the optical arrangement would need to be modified to accommodate for more sensors. In one embodiment, the optical prism 509 may be replaced by a diffractive optical element configured to direct the light beam at different angles of incidence onto a plurality of sensors.

The invention claimed is:

1. An optical measuring system, comprising
   1) a polymer-based single-mode fibre-optic sensor system comprising at least one micro-structured polymer-based single-mode optical fibre comprising at least one fibre-Bragg grating;
   2) an optical interrogator comprising a broadband light source arrangement for emitting light at a plurality of wavelengths within a wavelength range, and a spectrum analysing arrangement for receiving and analysing light reflected from the polymer-based single-mode fibre-optic sensor system; and
   3) an optical arrangement interconnecting the optical interrogator and the polymer-based single-mode fibre-optic sensor system, wherein the optical arrangement includes a silica-based fibre-optic arrangement forming a silica-based fibre-optic distribution network, the silica-based distribution network including
      a) one or more silica-based fibre circulators, or
      b) one or more silica-based fibre couplers.

2. An optical measuring system according to claim 1, wherein the broadband light source arrangement is adapted to emit a plurality of wavelengths within the wavelength range 400-2500 nm.

3. An optical measuring system according to claim 1, wherein the broadband light source arrangement is adapted to emit a plurality of wavelengths within the wavelength range 600-650 nm.

4. An optical measuring system according to claim 1, wherein the spectrum analysing arrangement comprises a spectrum analyser, said spectrum analyser comprising a charge-coupled device (CCD) spectrometer or a plurality of discrete detectors.

5. An optical measuring system according to claim 1, wherein the optical arrangement interconnecting the optical interrogator and the polymer-based single-mode fibre-optic sensor system comprises a free-space optical lens systems.

6. An optical measuring system according to claim 1, wherein the polymer-based single-mode fibre-optic sensor system comprises one or more micro-structured polymer-based single-mode optical fibres, and wherein each of the one or more micro-structured polymer-based single-mode optical fibres comprises one or more fibre Bragg gratings being arranged therein.

7. An optical measuring system according to claim 6, wherein the one or more fibre Bragg gratings are adapted to measure at least one physical parameter.

8. An optical measuring system according to claim 7, wherein at least one of the one or more micro-structured polymer-based single-mode optical fibres comprise three fibre Bragg gratings being adapted to measure strain, temperature and humidity at essentially the same time.

9. An optical measuring system according to claim 8, wherein the three fibre Bragg gratings of the at least one micro-structured polymer-based single-mode optical fibre are located at essentially the same spot.

10. An optical measuring system according to claim 1, further comprising
   1) a wireless communication system adapted to provide data to and/or from the optical measuring system, and
   2) a power supply system.

11. An optical measuring system according to claim 1, wherein the broadband light source arrangement comprises a broadband laser source.

12. An optical measuring system according to claim 1, wherein the broadband light source arrangement comprises a supercontinuum laser source.

* * * * *